United States Patent
Yabe

(10) Patent No.: US 8,579,271 B2
(45) Date of Patent: Nov. 12, 2013

(54) MACHINE TOOL WITH A WORKPIECE MOUNTING BLOCK

(75) Inventor: Kazutoshi Yabe, Tokyo (JP)

(73) Assignee: Makino Milling Machine Co., Ltd., Tokyo (JP)

( * ) Notice: Subject to any disclaimer, the term of this patent is extended or adjusted under 35 U.S.C. 154(b) by 410 days.

(21) Appl. No.: 12/992,664

(22) PCT Filed: Sep. 1, 2008

(86) PCT No.: PCT/JP2008/066132
§ 371 (c)(1),
(2), (4) Date: Nov. 15, 2010

(87) PCT Pub. No.: WO2009/144845
PCT Pub. Date: Dec. 3, 2009

(65) Prior Publication Data
US 2011/0062642 A1    Mar. 17, 2011

(30) Foreign Application Priority Data
May 27, 2008    (JP) .................................. 2008-138544

(51) Int. Cl.
B25B 1/20    (2006.01)
(52) U.S. Cl.
USPC .................................. 269/37; 269/71; 269/55
(58) Field of Classification Search
USPC ........... 269/37, 900, 909, 289 R, 291, 55, 71, 269/60, 74
See application file for complete search history.

(56) References Cited

U.S. PATENT DOCUMENTS

| | | | | |
|---|---|---|---|---|
| 4,568,070 A * | 2/1986 | Severt | ............................. | 269/60 |
| 4,653,739 A * | 3/1987 | Moore | ............................. | 269/61 |
| 5,595,378 A * | 1/1997 | Martinsson et al. | ............ | 269/210 |
| 7,094,012 B1 * | 8/2006 | Bang et al. | .................... | 409/221 |
| 7,314,215 B2 * | 1/2008 | Vosoughkia | .................. | 269/296 |
| 8,231,118 B2 * | 7/2012 | Tozaki | ............................ | 269/71 |
| 2006/0237889 A1 * | 10/2006 | Vosoughkia | .................. | 269/296 |
| 2009/0302517 A1 * | 12/2009 | Patel | .............................. | 269/71 |
| 2011/0062642 A1 * | 3/2011 | Yabe | ............................... | 269/37 |

FOREIGN PATENT DOCUMENTS

| | | |
|---|---|---|
| DE | 10209767 A1 | 9/2003 |
| JP | 06270029 | 9/1994 |
| JP | 08025164 A | 1/1996 |
| JP | 2001225235 | 8/2001 |
| JP | 2002331431 A | 11/2002 |
| JP | 2004142046 A | 5/2004 |
| JP | 2008114304 A | 5/2008 |

* cited by examiner

Primary Examiner — Lee D Wilson
(74) Attorney, Agent, or Firm — Paul & Paul

(57) ABSTRACT

A machine tool with a workpiece mounting block is provided that permit a plurality of workpieces to be mounted and machined without giving rise to interference between the workpiece or a table and a main spindle. Work mounting section (27) in a shape of square pyramid with four sides serving as workpiece mounting surfaces is fixed to table (17). Main spindle (19) with tool (23) mounted thereon can be moved relative to table (17) in three mutually orthogonal X, Y, and Z-directions, and table (17) can be moved in rotation feed in A and C-directions. Positions of rotation angle of A-axis and C-axis when the workpiece mounting surface is perpendicular to the axis of main spindle (19) are stored in advance in storage mechanisms. When workpieces (33) mounted on the workpiece mounting surfaces are to be machined, a workpiece coordinate system is set based on the stored positions of the rotation angle and NC machining is carried out.

3 Claims, 4 Drawing Sheets

MACHINE TOOL WITH A WORKPIECE MOUNTING BLOCK

FIELD OF THE INVENTION

The present invention relates to a machine tool with a workpiece mounting block for mounting a plurality of workpieces.

BACKGROUND ART

When multi-workpiece processing is carried out, i.e., a plurality of workpieces are mounted to a table of a machine tool and are successively machined, a rotation indexing table provided with a prism-shaped multi-face angle rest is generally utilized. Workpieces are mounted to respective workpiece mounting faces of angle rest, and after machining of one workpiece has finished, the table is indexed to proceed to machining of the next workpiece. As an example, a three face angle rest is disclosed in Japanese Unexamined Patent Publication No. 2004-142046.

Also, in Japanese unexamined Patent Publication No. 2001-225235, a machine tool is disclosed in which a main spindle is inclined to the vertical axis, and a turntable having a first table surface forming a machining area and a second table surface located outside the machining area so as to form workpiece setting and product pickup area is arranged for rotation on an axis of rotation situated in the midst of both surfaces, wherein the first table surface is arranged in a plane perpendicular to the inclined main spindle and the second table surface is arranged in a horizontal plane. This turntable is used such that workpieces are respectively mounted on the two surfaces inclined relative to each other in order to exchange workpieces between the workpiece machining area and the workpiece setting and pickup area.

In a case where multi-workpiece processing of a plurality of workpieces is performed using a five-axis numerically controlled machine tool having three linear feed axes for relatively moving a main spindle for mounting a tool relative to a table for mounting workpieces in three orthogonal directions of X, Y and Z axes and two orthogonal rotation feed axes for rotating the table about the linear feed axes. If a prism-shaped multi-face angle rest as disclosed in Japanese Unexamined Patent Publication No. 2004-142046 is used in this case, it is difficult to machine the lower surface of the workpiece facing to the upper surface of the table due to interference of the main spindle and the table. However, if multi-workpiece processing is to be performed without using a multi-face angle rest such that a plurality of workpieces are mounted in the same plane as the upper surface of the table, it is difficult to machine a surface of the workpiece facing to other workpiece due to interference of the main spindle with the workpieces.

In the case of the machine tool disclosed in Japanese Unexamined Patent Publication No. 2001-225235, so-called multi-workpiece machining in which the table is indexed only in the machining area and a plurality of workpieces are successively machined is not performed. Therefore, there is no description or suggestion of machining a plurality of workpieces without resulting in interference of the workpiece or table with the main spindle.

DISCLOSURE OF THE INVENTION

In view of the problems as described above, it is an object of the present invention to provide a machine tool with a workpiece mounting block in which a plurality of workpieces can be mounted and can be machined without resulting in interference of the workpiece or the table with the main spindle.

In order to attain the above object, in accordance with the present invention, there is provided a workpiece mounting block for mounting a plurality of workpieces that is formed in a polygonal pyramid shape comprising a workpiece mounting section with sides of the pyramid shape serving as workpiece mounting surfaces and a fixing section for fixing the workpiece mounting section to a table of a machine tool.

The workpiece mounting block thus constructed in accordance with the present invention is fixed via the fixing section to the table of the machine tool, and workpieces are mounted to the workpiece mounting section of the workpiece mounting block. Thus, workpieces are mounted inclined to each other to a plurality of sides of the polygonal pyramid shape so that space can be secured between adjoining workpieces. Preferably the workpiece mounting section is formed in square pyramid shape.

Also, in accordance with the present invention, there is provided a machine tool having three linear feed axes in three mutually orthogonal directions of X, Y and Z axes and at least two rotation feed axes from among A, B and C axes, comprising a table base that can be rotated in a direction of the A and B axes, a table that is supported on the table base and can be rotated in the rotation feed axis orthogonal to the rotation feed axis for rotating the table base, and a workpiece mounting block having a workpiece mounting section formed in polygonal pyramid shape with sides of the polygonal pyramid shape as workpiece mounting surfaces and a fixing section for fixing the workpiece mounting section to the table.

In the machine tool constructed in this manner, the workpiece mounting block is fixed to the table that can change attitude by rotation in the two rotation feed axes, and workpieces are mounted to the workpiece mounting section having a plurality of sides of the pyramid-shaped workpiece mounting block as workpiece mounting surfaces, and workpieces are machined in relative motion between the workpieces and the tool mounted on the main spindle. Since workpieces are mounted to the polygonal pyramid shape of the workpiece mounting section so as to be inclined to each other, sufficient space can be secured between adjoining workpieces. In order to machine a workpiece from a desired direction, the table base and the table are rotated in the directions of respective rotation feed axes. After machining of one workpiece has been finished, the table is indexed to machine the next workpiece.

Also, in accordance with the present invention, there is provided a machine tool further comprising workpiece clamp means for detachably mounting workpieces to the polygonal pyramid-shaped workpiece mounting section of the workpiece mounting block. It is possible to use the workpiece clamp means to mount and dismount workpieces easily to and from the workpiece mounting section.

Also, in accordance with the present invention, there is provided a machine tool further comprising storage means for storing the position of the rotation angle of the rotation feed axes for rotating the table base and the table, whereby the position of rotation angle of the rotation feed axis for rotating the table base and the position of rotation angle for rotating the table when one workpiece mounting surface of the workpiece mounting section formed in the shape of polygonal pyramid of the workpiece mounting block is perpendicular to the axis of the main spindle, are stored.

Thus, the position of rotation angle of the rotation feed axis for rotating the table base and the position of rotation angle of the rotation feed axis for rotating the table when one workpiece mounting surface of the workpiece mounting block is perpendicular to the axis of the main spindle, are stored in the storage means. These stored positions of the rotation angle are used as reference values for setting the workpiece coordinate system when the workpiece mounted to the workpiece mounting section is to be machined.

In accordance with the present invention, sides of the polygonal pyramid shape of the workpiece mounting section are used as the workpiece mounting surfaces so that, when a plurality of workpieces are mounted to the workpiece mounting section, sufficient space can be secured between adjoining workpieces to permit the tool mounted on the main spindle to approach relative to the workpiece from all directions. Thus, there is no interference between the workpiece or the table and the main spindle when the workpiece mounted to the workpiece mounting section is to be machined. When the workpiece mounting section is formed in square pyramid shape, four workpieces can be mounted to the workpiece mounting section. By providing workpiece clamp means in the workpiece mounting section, workpiece can be easily mounted and dismounted, and mounting and dismounting of workpieces can be automated.

Also, storage means for storing the positions of rotation angle of the rotation feed axes for rotating the table base and the table are further provided so that, by storing the position of rotation angle of the rotation feed axis for rotating the table base and the position of rotation angle of the rotation feed axis for rotating the table when one workpiece mounting surface of the workpiece mounting section formed in polygonal pyramid shape of the workpiece mounting block is perpendicular to the axis of the main spindle, workpiece coordinate system can be easily set for each workpiece mounting surface. Thus, since the workpieces are mounted to the inclined workpiece mounting surfaces of the polygonal pyramid shape, machining program can be prepared as if the workpieces are mounted to a plane perpendicular to Z-axis, i.e., the axis of the main spindle, and programming of machining is thereby simplified.

BRIEF DESCRIPTION OF THE DRAWINGS

The above and other objects, features and advantages of the present invention will be described in further detail with reference to appended drawings showing embodiments of the present invention.

FIGS. 2A to 2D are sectional views taken along the line D-D of FIG. 1, wherein FIG. 2A shows a state with A-axis being horizontal, FIG. 2B shows a state with A-axis inclined at 30 degrees, FIG. 2C shows a state with A-axis inclined at 120 degrees, and FIG. 2D shows a state with A-axis inclined at 60 degrees;

BEST FORM FOR CARRYING OUT THE INVENTION

The machine tool with a workpiece mounting block according to preferred embodiments of the present invention will be described below with reference to drawings.

Figure 1:
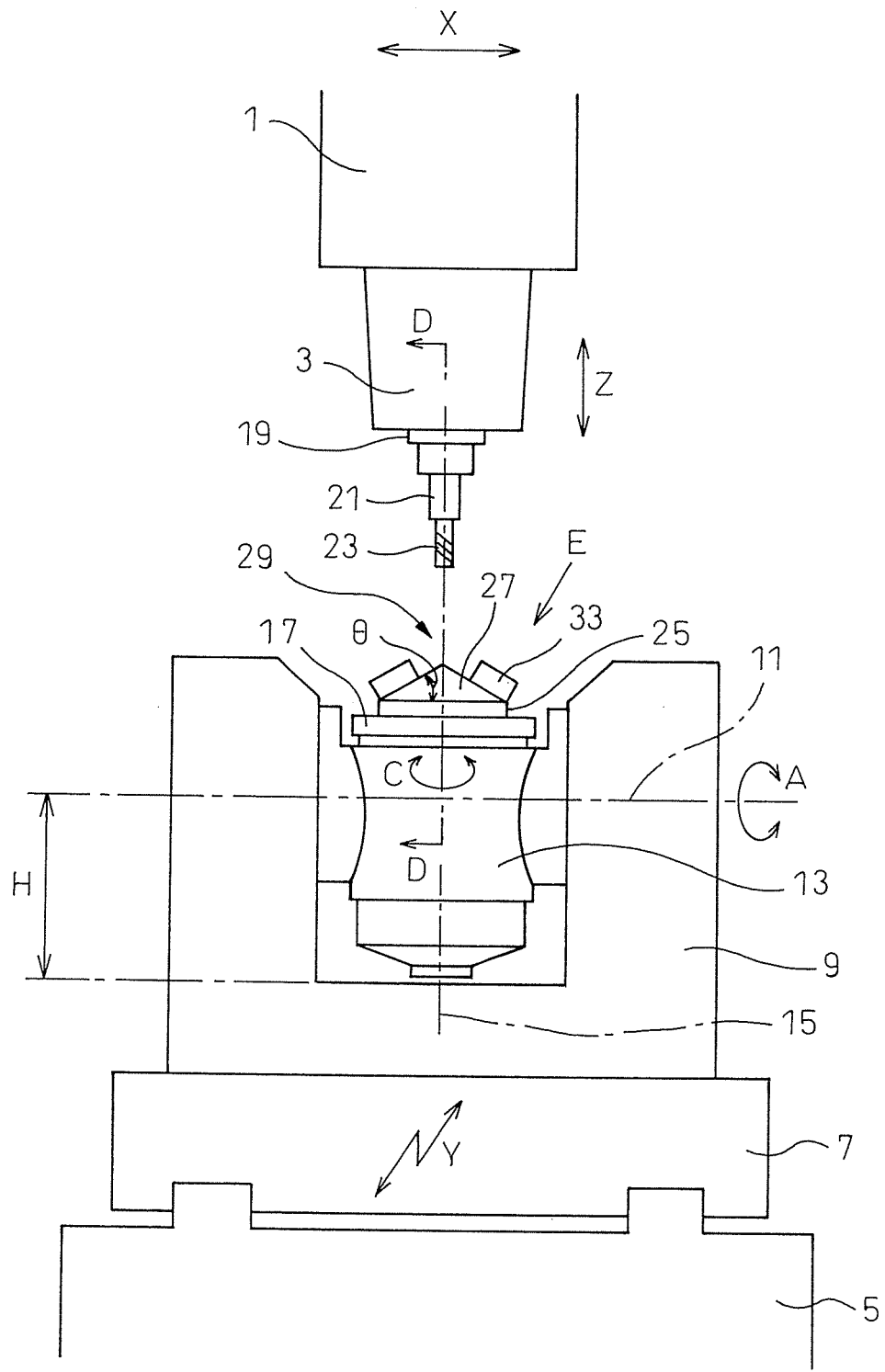
FIG. 1 is a front view showing a workpiece mounting block and a machine tool according to an embodiment of the present invention.

Referring to FIG. 1, a machine tool comprises saddle 1 movable in X-axis direction to left and right, spindle head 3 movable in Z-axis direction up and down relative to saddle 1, movable platform 7 movable in Y-axis direction forward and backward on bed 5, table base 13 rotatable in A-axis direction about rotation axis 11 parallel to X-axis on support 9 fixed to movable platform 7, and table 17 rotatable in C-axis direction about rotation axis 15 parallel to Z-axis on table base 13. Saddle 1 is provided movably in X-axis direction on a column (not shown) erected upright on bed 5 behind movable platform 7. Main spindle 19 is vertically supported rotatably on spindle head 3, and tool holder 21 grasping tool 23 is mounted at the distal end of main spindle 19.

On table 17, workpiece mounting section 27 in the shape of square pyramid is placed via plate 25 in the shape of rectangular parallelepiped with the bottom surface of workpiece mounting section 27 in close contact with plate 25, and workpiece mounting section 27 is fixed to table 17 with bolts, T-slot nuts, etc. Work mounting section 27 and plate 25 constitute a workpiece mounting block. Plate 25 is used when the workpiece mounting position is to be raised above the upper surface of the table, and is not essential to the present invention. Plate 25 may be formed as a pedestal integrally with workpiece mounting section 27 in one unit. Also, plate 25 or the pedestal may be omitted, and workpiece mounting section 27 may be fixed directly to table 17. A fixing section described in claims refers to, in the present embodiment, plate 25, pedestal, or the bottom surface of workpiece mounting section 27.

On workpiece mounting section 27 in the shape of square pyramid, workpieces 33 are mounted to respective workpiece mounting surfaces 31 consisting of four sides of the square pyramid. In order to mount workpiece 33 to workpiece mounting surface 31, methods such as using thread holes formed in workpiece mounting surface 31 to mount the workpiece with bolts or fastening plates, using a chuck or a clamper provided on workpiece mounting surface 31 to mount the workpiece, etc., may be employed. Work mounting section as described in claims refers, in the present embodiment, generally to the four workpiece mounting surfaces consisting of the sides of the square pyramid. Polygonal pyramid shape in the present invention includes triangular pyramid, square pyramid, pentagonal pyramid, truncated square pyramid, truncated pentagonal pyramid, etc.

In the present embodiment, end mill of 10 mm in outer diameter is mounted via tool holder 21 having a collet chuck to the distal end of the spindle head formed with a taper hole in accordance with JIS 40. Table 17 is a trunnion type table device in the shape of a circle of 200 mm in diameter with distance H of 200 mm between rotation axis 11 of A-axis and the concave inner upper surface of concavely formed support 9. Work mounting section 27 is a square pyramid with the bottom surface being square of side P of 140 mm and with inclination angle θ of workpiece mounting surface 31 relative to the bottom surface of 30 degrees, and is fixed together with plate 25 of the same size as the bottom surface to table 17 with bolts.

Figure 3:
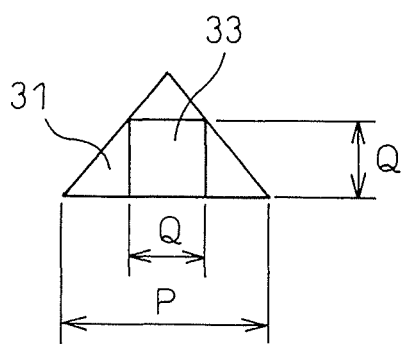
FIG. 3 is a fragmentary view as seen from the arrow E of FIG. 1.

As shown in the view on arrow of one workpiece mounting surface 31 as seen from arrow E (FIG. 3), workpiece 33 in the shape of rectangular parallelepiped with the bottom surface being a square with a side Q of 50 mm and with height R being 25 mm, i.e., half the length of Q, is mounted to workpiece mounting surface 31. This can be mounted to workpiece mounting surface 31 without projecting out of the boundary, and is based on the assumption that height R of the rectangular parallelepiped is a half of side Q of the bottom square, and represents the maximum workpiece dimensions for the majority of workpieces machined at the actual site.

Figure 2A:
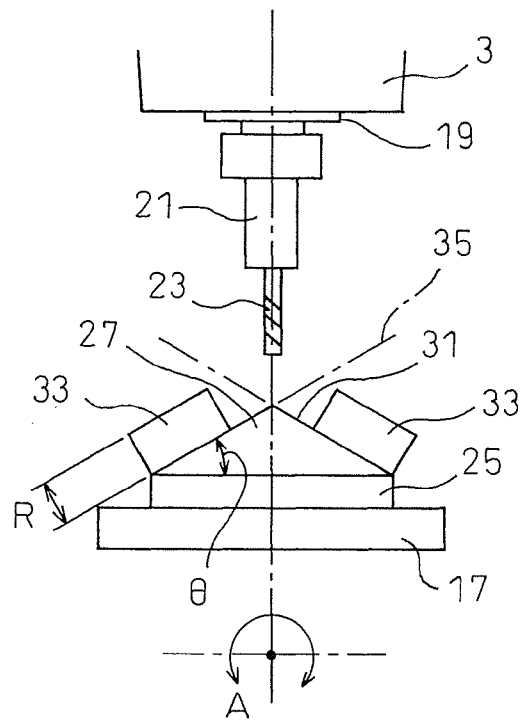

It is required, as shown in FIG. 2A, that workpiece 33 can be mounted without projecting out of the extension of workpiece mounting surface 31. This is necessary in order to eliminate interference between other workpiece 33 and tool holder 21 or tool 23 when, as shown in FIG. 2D, workpiece 33 is machined with surface 33c perpendicular to the axis of the main spindle.

Figure 2B:
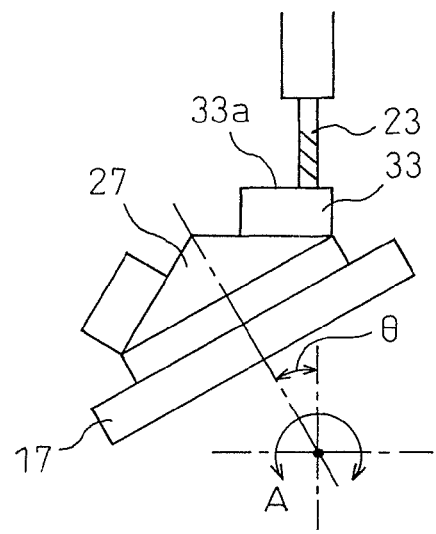
Figure 2C:
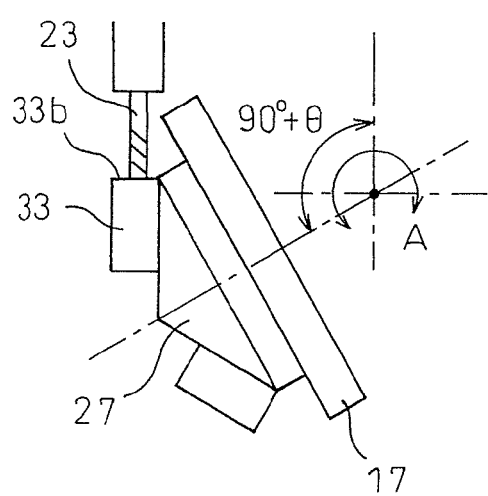
Figure 2D:
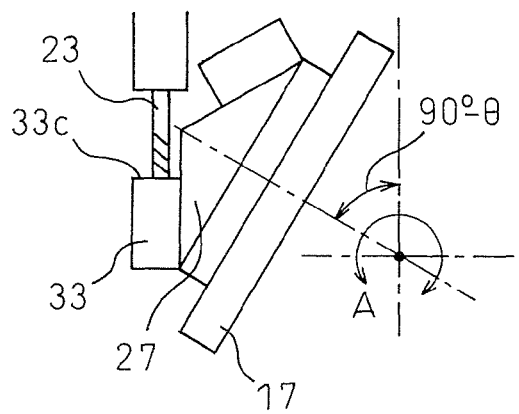

FIG. 2B shows that, when workpiece 33 is to be machined with surface 33a positioned perpendicular to the axis of main spindle 19, A-axis is inclined at inclination angle θ of 30 degrees. When surface 33a of other workpiece 33 is to be machined, C-axis is rotationally indexed from this state by 90 degrees successively. FIG. 2C shows that, when workpiece 33 is to be machined with surface 33b positioned perpendicular to the axis of main spindle 19, A-axis is inclined at inclination angle 90 degrees+θ, that is, 120 degrees. FIG. 2D shows that, when workpiece 33 is to be machined with surface 33c positioned perpendicular to axis of main spindle 19, A-axis is inclined at inclination angle 90 degrees−θ, i.e., 60 degrees.

Figure 4:
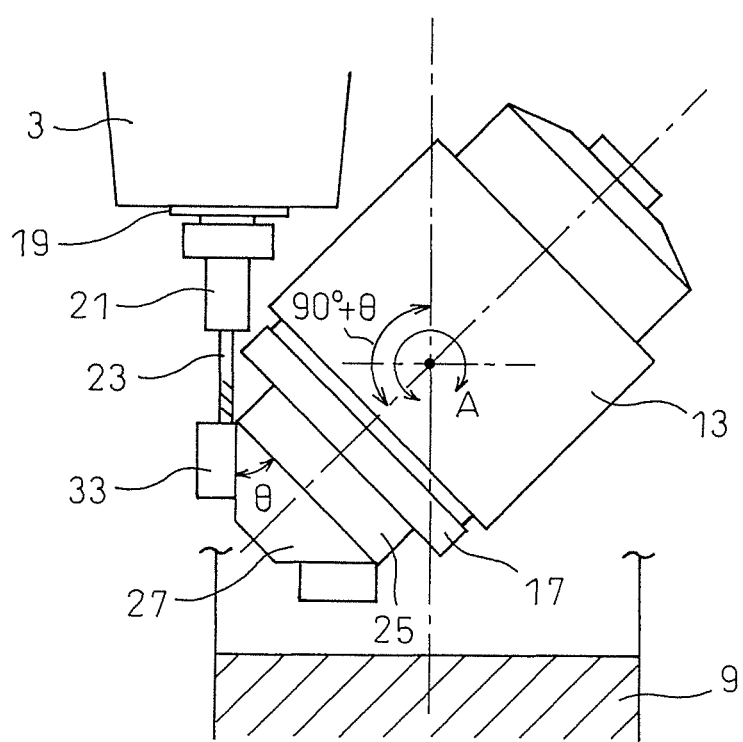
FIG. 4 is view useful for explaining a state with another workpiece mounting section fixed to the table and with A-axis inclined at 135 degrees.

If inclination angle θ of workpiece mounting surface 31 of workpiece mounting section 27 in the shape of square pyramid is set to a different angle value, it is necessary to change, in accordance with this different angle value, the positions of the rotation angle of A-axis when surface 33a, 33b, and 33c of workpiece 33 are perpendicular to the axis of main spindle 19. When machining is to be performed as shown in FIG. 2B, FIG. 2C, and FIG. 2D, there is no interference between tool holder 21 and table 17 even if the projecting length of tool 23 from tool holder 21 is 50 mm. However, in the case as shown in FIG. 4, it is required to extend the projecting length of tool 23 from tool holder 21 to 70 mm in order to avoid interference between tool holder 21 and table 17.

With the construction in which workpiece mounting section 27 in the shape of square pyramid is fixed to the table of the machine tool having three mutually orthogonal linear feed axes of X-, Y-, and Z-axes, and two rotation feed axes which permit table 17 to be rotated in the directions of A-axis and C-axis, and in which workpieces 33 are mounted respectively to four workpiece mounting surfaces 31 of workpiece mounting section 27, it is possible to index the five surfaces other than the bottom surface of workpiece 33 in the shape of rectangular parallelepiped so as to become perpendicular to the axis of main spindle 19, and to perform machining of the surfaces. The shape of workpiece 33 is not limited to rectangular parallelepiped, but may be of curved surface such as semi-spherical shape, and the curved surface can be machined from all directions. This is because space can be secured near vertex 29 of the square pyramid shape so that main spindle 19, tool holder 21 and tool 23 can approach to workpiece 33 without giving rise to interference.

The positions of the rotation angle of A-axis and C-axis when workpiece mounting surface 31 is perpendicular to the axis of main spindle 19 are determined in advance, and are stored in storage means (not shown). The values calculated from the shape and dimensions of workpiece mounting section 27 are used as the positions of the rotation angle of A-axis and C-axis stored in storage means. It is also possible to mount a measurement probe on main spindle 19 and measure workpiece mounting section 27 on board, and to store the inclination angle of the workpiece mounting surface as offset amounts of A-axis and C-axis. When workpiece 33 mounted to workpiece mounting surface 31 is to be machined, the positions of the rotation angle stored in storage means can be used to set workpiece coordinate system to perform NC machining. When workpieces to be subjected to same machining are mounted to respective workpiece mounting surfaces 31, if machining program for the workpiece on one workpiece mounting surface 31 has been prepared, it is only necessary to index A-axis and C-axis by the positions of the rotation angle stored in storage means in order to use same machining program to machine workpieces 33 mounted to other workpiece mounting surface 31. Thus, preparation of machining program is simplified.

In the present embodiment, inclination angle θ that permits the workpiece to be machined with the surface perpendicular to the axis of the main spindle without giving rise to interference between the workpiece or the table and the main spindle is in the range of 15 degrees to 53 degrees. In view of easy fabrication of the square pyramid shape and simple programming of machining, it is preferred to adopt the angle θ of 15 degrees, 30 degrees or 45 degrees.

Figure 5:
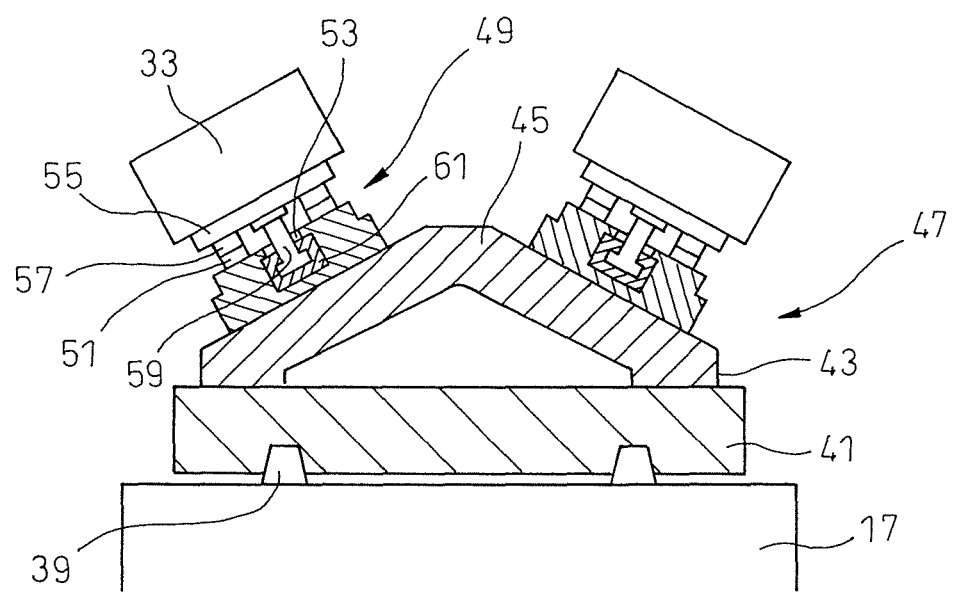
FIG. 5 is a sectional view showing a workpiece mounting block according to another embodiment of the present invention.

Next, an other embodiment of the present invention will be described with reference to FIG. 5. In this embodiment, pallet 41 is detachably mounted with a plurality of taper cone 39 and pallet clamp means (not shown) in a manner that allows positioning of the pallet, and pallet 41 is exchanged by a pallet exchanging device (not shown). To the upper surface of pallet 41, workpiece mounting section 45 in the shape of truncated square pyramid having pedestal portion 43 is fixed to constitute workpiece mounting block 47. In the present embodiment, pallet 41 and pedestal 43 constitute the fixing section of workpiece mounting block 47. Work clamp means 49 are respectively provided on four inclined sides of the truncated square pyramid shape. Positioning seats 51 and clamp holes 53 are formed in clamp means 49.

Figure 6:
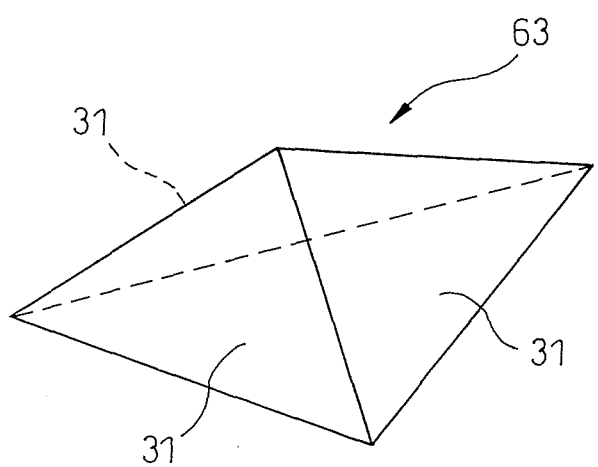
FIG. 6 is a perspective view showing a workpiece mounting section in the shape of triangular pyramid according to the present invention.

On the other hand, on the side of the workpiece, clamp member 55 is provided, and positioning part 57 corresponding to positioning seat 51 and pull stud 59 corresponding to clamp hole 53 are provided. By engagement of positioning part 57 with positioning seat 51, positioning of workpiece 33 on workpiece mounting section 45 can be carried out repeatedly in high precision. Pull stud 59 is inserted into clamp hole 53, and inside clamp hole 53, grasping device 61 actuated by a spring and fluid pressure detachably grasp workpiece 33. As workpiece clamp means, other means such as edge locator and hydraulic clamper, a three jaw chuck, or the like, may be used. It is also possible to use workpiece mounting section 63, as shown in FIG. 6, in the shape of triangular pyramid with three sides as workpiece mounting surfaces. Other workpiece mounting block in the shape of polygonal pyramid may also be used.

Although, in these embodiments as described above, a machine tool having a vertical main spindle, as well as A-axis and B-axis, is taken as an example, it is also possible that the machine tool has a horizontal main spindle, and table 17 has A-axis and B-axis or B-axis and C-axis. The rotation feed axes of A, B, and C axes are not limited to the trunnion type table device as used in the present embodiment, but may be used in the configuration such that a rotary table, for example, is fixed to movable platform 7 of the machine tool, and a rotary table is further placed on this rotary table. Inclination angle θ of workpiece mounting section 27 in the shape of square pyramid may be 15 degrees or 45 degrees. In case where inclination angle θ is 15 degrees, when surface 33a of workpiece 33 is to be machined, A-axis is indexed to 15 degrees, when surface 33b is to be machined, A-axis is indexed to 105 degrees, and when surface 33c is to be machined, A-axis is indexed to 75 degrees. In case where angle θ is 45 degrees, A-axis is indexed to 45 degrees, 135 degrees (see FIG. 4), and 45 degrees, respectively.

The invention claimed is:

1. A machine tool having three linear feed axes of X-axis, Y-axis and Z-axis and at least two rotation feed axes from among A-axis, B-axis and C-axis, comprising:
   a table base that is rotated in a direction of said A-axis or B-axis;
   a table that is supported by said table base and is rotated in a direction of rotation feed axis orthogonal to a rotation feed axis in which said table base is rotated; and
   a workpiece mounting block having a workpiece mounting section that is formed in a shape of polygonal pyramid with sides of the polygonal pyramid serving as workpiece mounting surfaces and a fixing section that fixes the workpiece mounting section to said table.

2. The machine tool as claimed in claim 1,
   further comprising workpiece clamp means for detachably mounting the workpiece to the workpiece mounting section formed in the shape of polygonal pyramid of said workpiece mounting block.

3. The machine tool as claimed in claim 1,
   further comprising storage means for storing positions of rotation angle of the rotation feed axes that rotate said table base and said table,
   whereby a position of the rotation angle of the rotation feed axis for rotating said table base and a position of the rotation angle of the rotation feed axis for rotating said table when one workpiece mounting surface of the workpiece mounting section formed in the shape of polygonal pyramid of said workpiece mounting block is perpendicular to the axis of the main spindle, are stored.

* * * * *